United States Patent Office 3,366,004
Patented Jan. 30, 1968

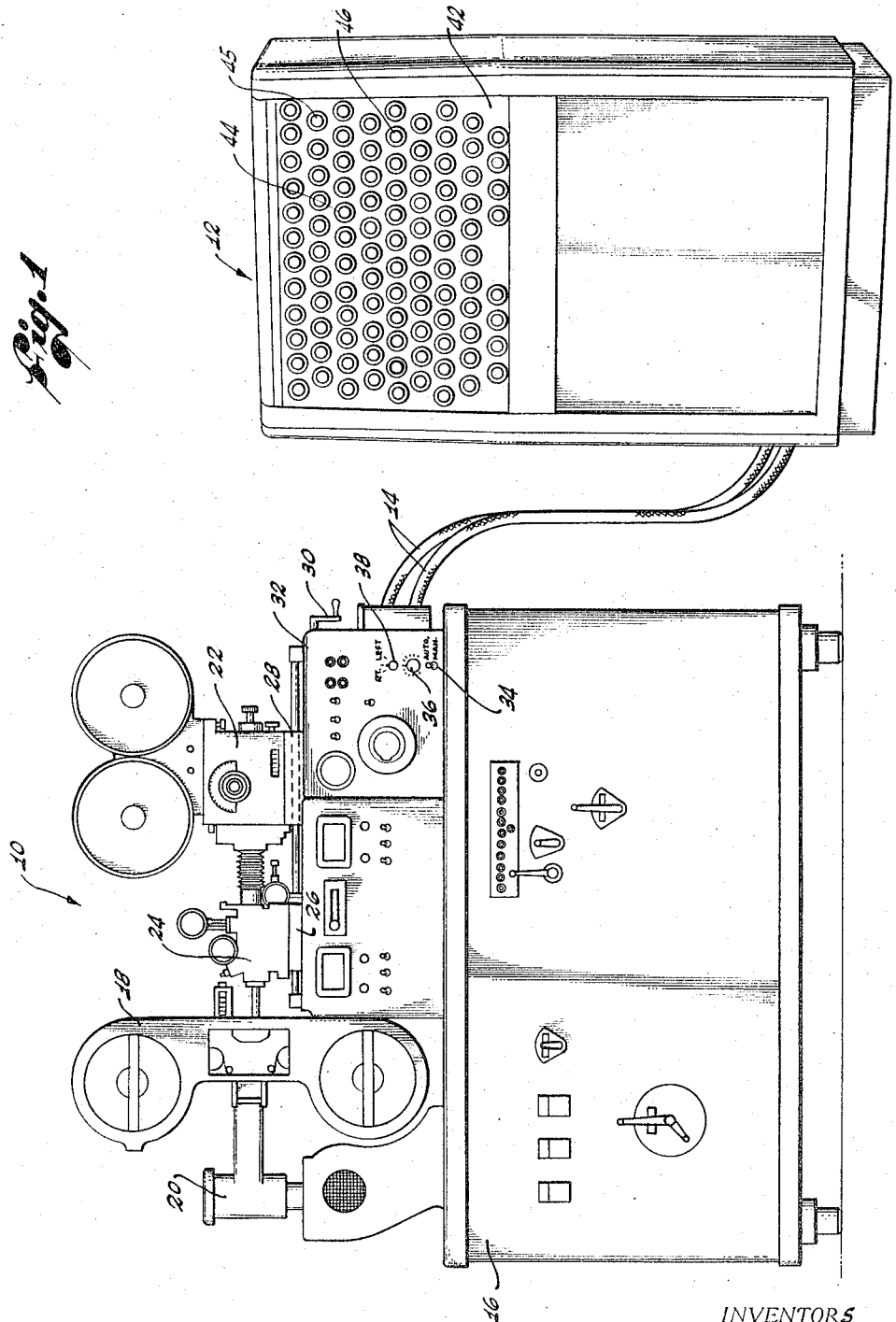

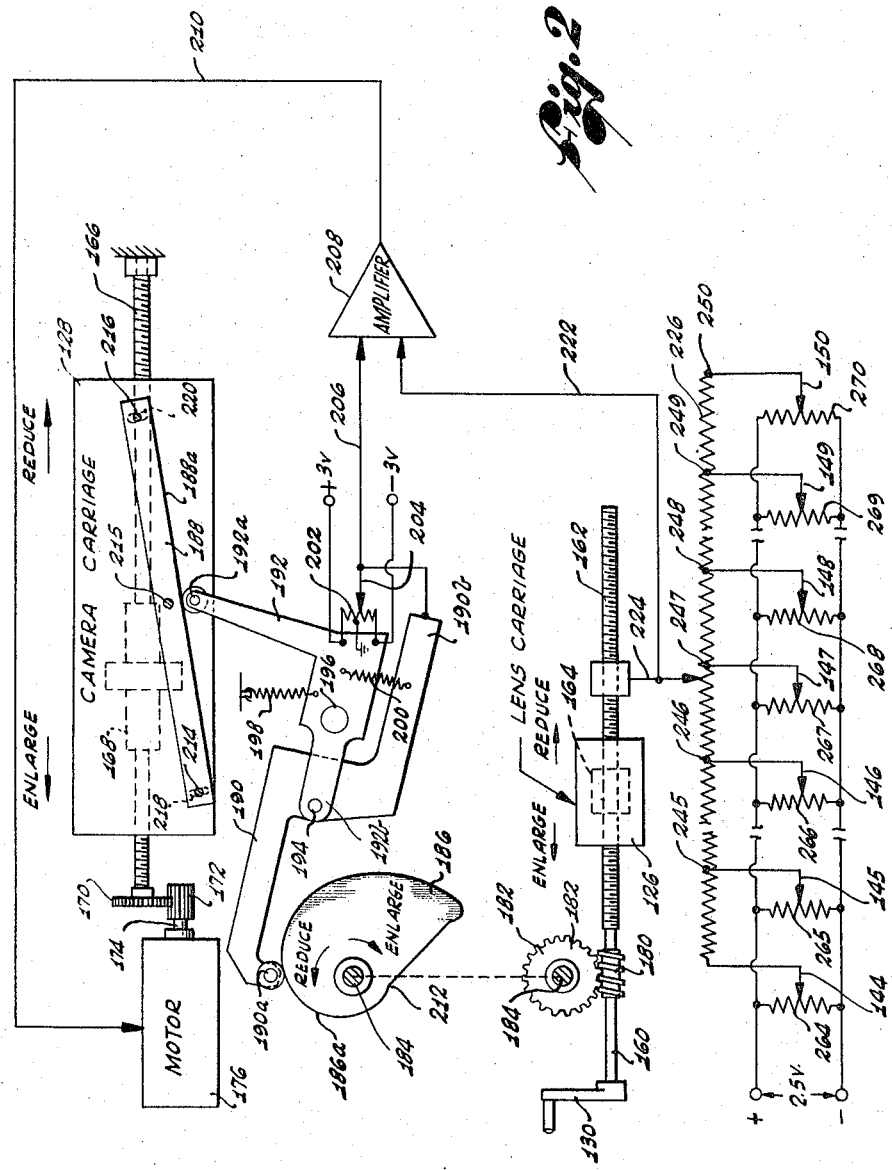

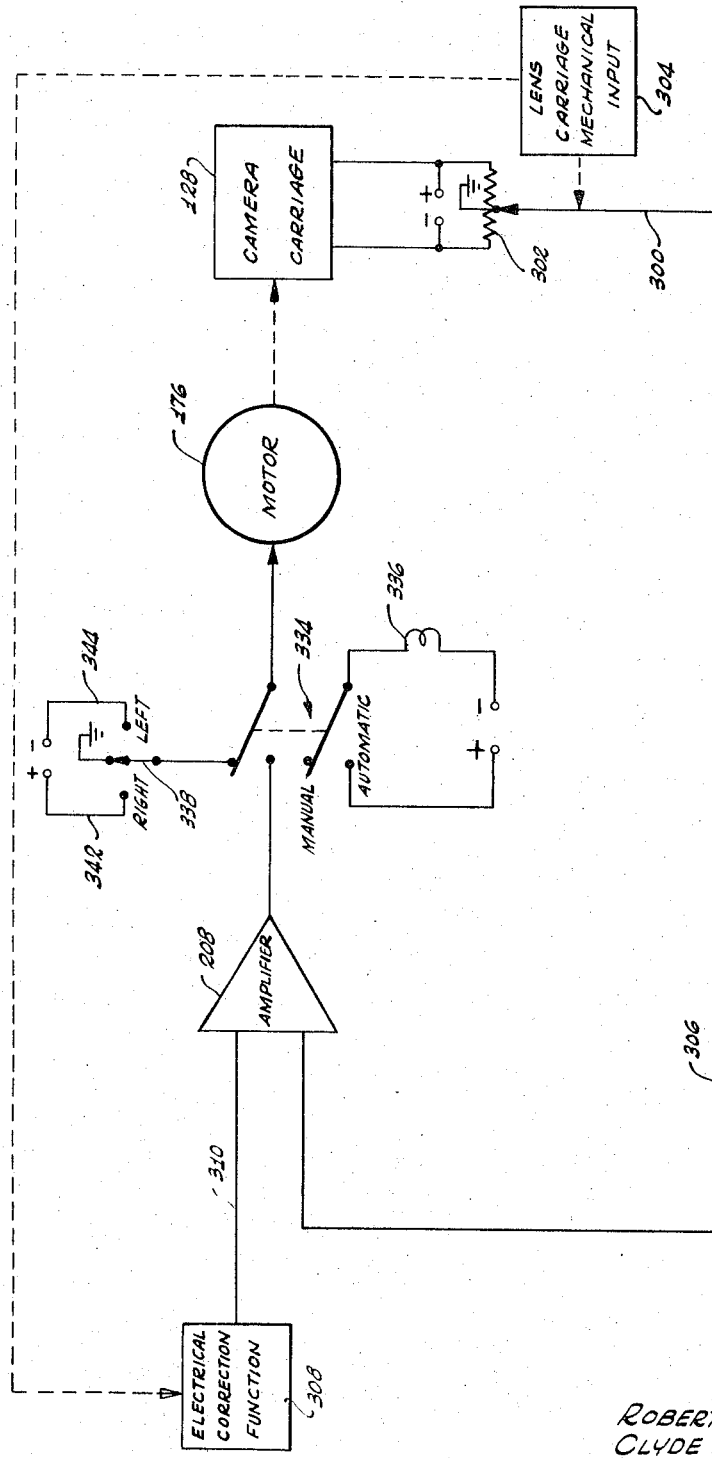

3,366,004
AUTOMATIC FOLLOW FOCUS SYSTEM
Clyde F. Czernek, Sepulveda, Robert M. Cox, Northridge, and Kenneth E. Turner, Woodland Hills, Calif., assignors to Producers Service Co., Division of Boothe Leasing Corp., Los Angeles, Calif., a corporation of California
Filed Jan. 15, 1965, Ser. No. 425,822
12 Claims. (Cl. 88—24)

ABSTRACT OF THE DISCLOSURE

Optical printing apparatus embodying an automatic follow focus system capable of selective calibration for lenses of different focal length. The printer lens and the camera are respectively mounted upon separate carriages for movement along separate lead screws. Movement of the camera carriage is under the control of a servomotor which in turn is operated by an amplifier receiving two inputs. One input to the amplifier is a calibration reference input which varies as the position of the lens carriage varies, whereas the other input to the amplifier is an error signal generated by a pair of cams, one cam being positioned by movement of the lens carriage and the other cam being positioned by movement of the camera carriage. The particular cams and the electrical calibration can be altered to meet the requirements of automatic follow focus for lenses of any desired focal length.

---

This invention relates generally to improvements in optical printer apparatus, and more particularly to a new and improved automatic follow focus system for such apparatus.

Optical printers have long been used by the motion picture industry for the creation of special effects, such as dissolves, wipe-offs, reverse action, stop-motion, double exposures, dolly and zoom shots, and innumerable other effects from film originally photographed in a studio by conventional camera techniques. Essentially, such optical printers comprises a projector mechanism through which a print of the original film is run, a camera mechanism which is synchronized with the projector to photograph the print, frame by frame, and an objective lens to focus the image of the print on the raw film within the camera. The many special effects are obtained by manipulations of the optical system, the dissolving shutter in the camera, the film drive mechanisms for the projector and camera, and various accessory devices which are adapted for use with the optical printer.

In such optical printers, it is desirable from the points of view of convenience and speed to incorporate a follow focus system into the printer apparatus so that, whenever the printer objective lens is moved relative to the plane of the film print in the projector to reduce or enlarge the camera image, the camera will automatically be moved relative to the printer lens to preserve a sharply focused image of the print at the camera film plane. A number of purely mechanical camming mechanisms have been developed to provide such automatic follow focus control over the relative positions of the camera and printer lens. However, the follow focus mechanisms heretofore provided have not always proven sufficiently precise in maintaining sharply focused camera images over a wide range of camera and printer lens movements. Hence, those concerned with the development of optical printers have long recognized the need for improved follow focus systems capable of higher accuracy.

Accordingly, it is a primary object of the present invention to provide a new and improved automatic follow focus system which overcomes the above and other disadvantages of the prior art.

Another object is to provide a new and improved electromechanical follow focus system. A further object of this invention is the provision of a new and improved automatic follow focus system utilizing servomechanism control in an optical printing apparatus.

Still another object is to provide a new and improved automatic follow focus system capable of precise repeatability and extremely high focusing accuracy.

Yet another object of the present invention is the provision of a new and improved servomechanism controlled follow focus system providing electrical correction for mechanical imprecision.

A still further object is to provide a new and improved follow focus system for an optical printer, wherein the follow focus system is adjustable to provide automatic focusing control for different effective focal lengths of the printer lens.

Another object of this invention is to provide a new and improved optical printer follow focus system wherein the camera and printer lens are also capable of relative movement independent of the follow focus system.

The above and other objects and advantages of this invention will become apparent from the following description, when taken in conjunction with the accompanying drawings of illustrative embodiments thereof, and wherein:

FIGURE 1 is a front elevational view of an optical printer embodying the automatic follow focus system of the present invention, and also illustrates the follow focus calibration control panel;

FIGURE 2 is a combined electromechanical schematic and block diagram of a presently preferred embodiment of an automatic follow focus system in accordance with the present invention; and FIGURE 3 is combined electromechanical schematic and block diagram of a generalized follow focus system which is also capable of selective disablement to permit relative movement of the camera and printer lens independent of follow focus control.

Referring now to the drawings, and particularly to FIGURE 1 thereof, there is shown an optical printer 10 and a follow focus calibration control console 12, the control console being electrically connected to the optical printer by a pair of multi-conductor electrical cables 14.

The optical printer 10 comprises a housing 16 upon which are mounted a projector 18 including a lamp house 20, a camera 22, and a printer objective lens unit 24. The printer lens unit 24 is mounted upon a carriage 26 and the camera 22 is mounted upon a carriage 28 to permit movement of the printer lens and camera relative to each other and relative to the projector 18.

A hand crank 30 is connected to an appropriate lead screw (not shown) within the housing 16 of the optical printer 10 for enabling selective movement of the lens carriage 26 and printer lens unit 24 with respect to the projector 18. In this connection, a follow focus system, the major portion of which is housed within the optical printer 10, electromechanically couples the camera carriage 28 with the lens carriage 26 so that positioning of the printer lens unit 24 will automatically accomplish a re-positioning of the camera 22 to maintain a sharply focused image of the projected film print at the camera film plane.

A plurality of controls for the optical printer 10 are mounted upon a control panel 32. These controls include a follow focus enablement and disablement toggle switch 34 having an "automatic" position and a "manual" position. In the "automatic" position of the switch 34, the follow focus system automatically controls the positioning of the carriage 28 and camera 22 relative to the printer lens unit 24. An indicating light 36 is illuminated whenever the switch 34 is in the "automatic" position. When the switch 34 is in the "manual" position, the follow focus system is disabled and the position of the carriage 28 and camera 22 is independent of the position of the printer lens unit 24.

A selector switch 38 mounted upon the control panel 32, controls the direction of rotation of a camera carriage drive motor (not shown) within the optical printer 10 for moving the carriage 28 and camera 22 in either direction when the switch 34 is in the "manual" position.

The follow focus control console 12 includes a control panel 42 behind which are mounted a plurality of calibration potentiometers (not shown). In practice, one hundred of these calibration potentiometers may typically be mounted within the control console 12. The control knobs and calibration dials 44–46, etc., for the sliders of each of the calibration potentiometers appear on the front face of the control panel 42. Each of these potentiometers is used to calibrate the follow focus system for a single particular point of the camera and printer lens travel throughout the entire zoom range of the optical printer from image reduction through image enlargement. The calibration output of each of the potentiometers is directed over an individual conductor within the cables 14 as an input to that portion of the follow focus system housed within the optical printer 10. It will be apparent that, by readjusting the calibration potentiometers in the control console 12, the calibration input to the follow focus system can be altered to provide automatic and accurate follow focus operation for printer optics having a wide range of different effective focal lengths.

Referring now more particularly to FIGURE 2, there is shown a preferred embodiment of a follow focus system in accordance with the present invention. The lens carriage 126 and camera carriage 128 in FIGURE 2 correspond to the lens carriage 26 and camera carriage 28, respectively, in FIGURE 1. The hand crank 130 in FIGURE 2 corresponds to the hand crank 30 in FIGURE 1 for varying the position of the lens carriage and its associated printer lens unit mounted thereon. The potentiometer slider arms 144–150 in FIGURE 2 correspond to the calibration potentiometer controls 44, 45, 46, etc. of the follow focus control console 12 in FIGURE 1.

The hand crank 130 is affixed to one end of a shaft 160 which is driven by the hand crank so that rotation of the crank rotates the shaft about its own longitudinal axis. The opposite end of the shaft 160 comprises a lens carriage lead screw 162 which passes through and is in threaded engagement with a lens carriage drive sleeve 164 such as a ball nut or the like. Hence, rotary motion of the hand crank 130 is transmitted to the lead screw 162 which, in turn, induces translatory motion of the lens carriage 126 along the axis of the lead screw. In this manner, the hand crank 130 can be operated to move the lens carriage 126 and its associated printer lens unit to any desired position along the lead screw 162.

Similarly, a lead screw 166 passes through and is in threaded engagement with a camera carriage drive sleeve 168 such as a ball nut or the like. One end of the camera carriage lead screw 166 carries a coaxial spur gear 170 secured thereto, the latter gear being in mesh with another gear 172 secured to and driven by the output shaft 174 of a servomotor 176. Hence, rotation of the motor 176 causes rotation of the lead screw 166 which, in turn, induces translatory motion of the camera carriage 128 and the camera unit secured thereto along the longitudinal axis of the lead screw.

Also affixed to the shaft 160 for rotation therewith is a coaxial worm gear 180 in mesh with a worm wheel 182. The worm wheel 182 is affixed to one end of a concentric shaft 184, a rotary cam 186 being mounted at the opposite end of the shaft 184 for rotation therewith. With this arrangement, rotation of the hand crank 130 to move the lens carriage 126 along the lead screw 162 simultaneously rotates the cam 186 about the longitudinal axis of the shaft 184 via the worm gear 180 and worm wheel 182. Hence, the rotary position of the cam 186 is at all times indicative of the position of the lens carriage 126 along the lead screw 162.

A linear cam 188 is mounted upon the camera carriage 128 for movement therewith, the longitudinal axis of the linear cam forming an acute angle with the longitudinal axis of the camera carriage lead screw 166.

One end 190a of a cam follower 190 is in constant contact with and rides along the peripheral camming surface 186a of the rotary cam 186. One end 192a of a cam follower 192 is in engagement with and rides along the peripheral camming surface 188a of the linear cam 188 upon the camera carriage 128. The cam follower 190 is pivotally mounted at 194 to the end 192b of the cam follower 192 opposite the end 102a. The cam follower 192 is, in turn, pivotally mounted at 196 upon some stationary portion of the optical printer apparatus.

A pair of coil springs 198 and 200 are connected between appropriate anchor points on the cam followers 190, 192 and some stationary portion of the optical printer apparatus to bias the follower ends 190a and 192a against the camming surfaces 186a and 188a, respectively.

The resistance portion 202 of an error potentiometer is mounted upon the cam follower 192 for movement therewith. The slider 204 of the error potentiometer is affixed to the end 190b of the cam follower 190 opposite the end 190a. Hence, it will be apparent that the position of the slider 204 along the resistance 202 of the error potentiometer is a function of the positions of both cam followers 190 and 192. These cam follower positions are controlled by the positions of the rotary cam 186 and the linear cam 188, respectively, which are, in turn, controlled by and indicative of the positions of the lens carriage 126 and the camera carriage 128, respectively.

A D.C. voltage is applied across the resistance portion 202 of the error potentiometer, typical electrical potentials being +3.0 volts and −3.0 volts. The center of the potentiometer resistance 202 is preferably grounded to insure zero potential at the potentiometer mid-point. The error potential at the potentiometer slider 204 is a function of the relative positions of the cam followers 190 and 192 with respect to each other, and this error potential is directed over line 206 as one input to an error voltage amplifier 208 whose output is fed over line 210 to the servomotor 176. The existence of an error voltage energizes the motor 176 to reposition the camera carriage 128 along the lead screw 166 until the cam follower 192 has been relocated in such a manner as to reduce the error voltage to zero and thus stop the motor 176. The latter occurs when the camming surface 188a has moved the cam follower 192 to a position whereby the slider 204 is at the zero potential mid-point of the potentiometer resistance 202. Ideally, this servomechanism arrangement slaves camera carriage movement in such a way that the camera image is always in sharp focus for every position of the printer lens with respect to the projector.

In order to accomplish such follow focus operation, the radial distance from the center of the shaft 184 of each point along the camming surface 186a of the rotary cam 186 must be equal to the displacement of the follower arm 190 necessary to produce the corresponding precise displacement of the potentiometer slider 204 which will generate an error signal of proper magnitude and polarity to move the camera carriage 128 via the servomotor 176 so that the camera image is always in sharp focus. The exact curve for the camming surface 186a may be computed from standard optical formulas and the geometry of the system for the specific focal length of any given printer lens, or the camming surface may be manually plotted for a given lens on a point-by-point basis for each camera carriage position providing a sharply focused camera image corresponding to a plurality of different lens carriage positions.

Typical directions of movement for accomplishing image enlargement or reduction are indicated by arrows for the lens carriage 126, camera carriage 128 and rotary cam 186 for magnification ratios below 1:1. By way of example, let it be assumed that the projector (not shown) of the optical printer is to the left of the lens carriage 126 in FIGURE 2. If it is desired to reduce the size of the camera image, the hand crank 30 is rotated to move the lens carriage 126 to the right in FIGURE 2. This induces counterclockwise rotation of the cam 186 which displaces the slider 204 of the error potentiometer to generate a negative error potential. This error potential is amplified by amplifier 208 and energizes the servomotor 176 to drive the camera carriage 128 to the right in FIGURE 2. As the camera carriage moves to the right, the cam follower 192 is cammed by the surface 188a so that the cam follower 192 pivots about the point 196 to reposition the potentiometer resistance 202 and slider 204 (via the cam follower 190 secured to the end 192b of cam follower 192) until the error potential is reduced to zero.

The same analysis described above for camera image reduction applies for camera image enlargement, but the movements of the carriages and cams are in the opposite directions up to a 1:1 magnification ratio. Above a 1:1 magnification ratio, which occurs at the point 212 along the camming surface 186a of the rotary cam 186, the lens carriage 126 and cam 186 will still move in the same directions indicated for image enlargement, but the camera carriage 128 will move in the opposite direction from that indicated in FIGURE 2 by the arrow for image enlargement.

The use of two cam followers 190, 192 instead of a single cam follower, the use of double pivot points 194, 196 and the use of a linear cam 188 all serve to minimize the range of movement of the error potentiometer slider 204 over the entire travel range of the lens and camera carriages and, hence, facilitate the use of an error potentiometer having smaller physical dimensions. Essentially, the linear cam 188 is a motion attenuator, the gain of which can be varied by varying the angle of the linear cam with respect to the longitudinal axis of the camera carriage lead screw 166. In this connection, the linear cam 188 is shown mounted to the camera carriage 128 by means of three bolts 214, 215 and 216, the bolts 214 and 216 at remote ends of the cam 188 passing through elongated slots 218 and 220, respectively, to permit pivotal adjustment of the cam 188 about the center bolt 215. This enables the cam angle, and hence the gain of the cam 188 with respect to the cam follower 192, to be varied.

It will be apparent that the rotary cam 186 may be removably mounted upon the shaft 184 so that the cam can be changed to adapt the follow focus system to printer lenses of different focal lengths. Alternatively, a plurality of rotary cams may be mounted side by side along the shaft 184, and the cam follower 190 may be positioned to ride along a selected one of these rotary cams in accordance with the particular printer lens for optical modification thereof (e.g., a beam splitter) being utilized.

The aforedescribed servomechanism arrangement for a follow focus system is limited in its accuracy to the mechanical accuracy of all of the system components. Since mechanical inaccuracies may, in the cumulative, prove to be quite substantial, precise automatic focusing of the camera image throughout the entire travel range of the camera and lens carriages may not prove entirely satisfactory.

In order to compensate for such mechanical deviations from the ideal follow focus function, a continuously variable electrical correction potential is fed as an additional input over line 222 to the error amplifier 208 for every pair of relative positions of the camera and lens carriages over their entire travel range. Typically, one hundred fine adjustment calibration points over the travel range are selected for the electrical correction potential, but the number of calibration points selected may be either increased or decreased depending upon the desired follow focusing accuracy. With one hundred calibration points, follow focusing accuracy to within ±.001 of an inch throughout the entire zoom range of the optical printer apparatus has been obtained in practice.

The calibration input over line 222 to the amplifier 208 is obtained from a slider 224 of a high resistance potentiometer 226 having approximately one hundred resistive sections, each section extending between two calibration points and typically having a resistance of 2.2 kilohms. The calibration points of the potentiometer 226 are indicated as 224–250, and the compensating electrical potential of each of these calibration points is set by the sliders 144–150, respectively. Each of the sliders 144–150 works in conjunction with a calibration potentiometer resistance 264–270, respectively, and each of these calibration potentiometer resistances is connected across a D.C. supply of typically 2.5 volts.

The electrical correction potential available at any point along the potentiometer 226 can be established by extrapolation between the two nearest calibration points. Therefore, the greater the number of calibration points over the length of the potentiometer resistance 226, the more uniformly accurate the electrical compensation provided for the mechanical inaccuracies of the follow focus system. The slider 224 is mounted upon a drive sleeve, such as a ball nut or the like, which is driven by the same lead screw 162 used to position the lens carriage 126. Hence, movement of the slider 224 is synchronized with movement of the lens carriage 126, and the slider 224 will always tap off the same electrical calibration potential from the potentiometer 226 for a given lens carriage position each time the lens carriage 126 is again located at that particular position. In this connection, the potentiometer 226 is located within the optical printer 10 in FIGURE 1, and the calibration potentials from the potentiometers 264–270 and 144–150 are fed to the calibrating points 244–250, respectively, of the potentiometer 226 via the multiconductor cable 14 in FIG. 1.

It will be apparent that, while the calibration potentiometers have been described for use solely to compensate for mechanical deviations from the ideal follow focus function, these same potentiometers can be readily readjusted to adapt the follow focus system for use with printer lenses of different focal lengths while using a single rotary cam 186. Although the mechanical inaccuracy of the cam 186 will be increased for a printer lens focal length other than that for which the cam was specifically designed, this merely requires additional electrical compensation by means of the calibration potentiometers.

The follow focus system of the present invention controls the movement of the camera and printer lens with respect to a subject plane to maintain a sharply focused image at the film plane within the camera. While the subject plane in the illustrated embodiment of the invention is the film plane in the projector, this is solely by way of example and it will be appreciated that the control system may be adapted to operate with respect to any established subject plane. For example, if the follow focus control system is used in conjunction with an aerial image projection system or the like, then the established subject plane relative to which the control system operates would be the plane of the projected aerial image rather than the film plane within the aerial image projector itself.

Referring now more particularly to FIGURE 3 of the drawings, there is shown an automatic follow focus system wherein the camera carriage can be positioned independently of the follow focus system, for deliberate out of focus camera image effects or where it is merely desired to move the camera carriage to one side of the optical printer apparatus for repair or maintenance operations. The drive amplifier 208, servomotor 176, and camera carriage 128 in FIGURE 3 correspond to the elements indicated by like numerals in the embodiment of the invention shown in FIGURE 2.

The slider 300 of an error potentiometer 302 is positioned by a lens carriage mechanical input arrangement 304 which may or may not include a camming device. In this connection, if the mechanical input from the lens carriage to the slider 300 is directly proportional to the lens carriage position, rather than being modified by some intermediate cam function, then the potentiometer resistance 302 may comprise a tapered winding, i.e., wound so that its resistance varies along its length in accordance with the desired follow focus function.

As in the case of the error potentiometer 202 in FIGURE 2, the error potentiometer 302 has equal amplitude potentials of opposite polarity applied to its remote ends, the mid-point of the potentiometer resistance being preferably grounded. The error potential tapped off by the slider 300 is directed over line 306 as one input to the amplifier 208. An electrical correction function 308 provides continuously variable calibration potentials as an additional input over line 310 to the amplifier 208. In this connection, the calibration potential varies in accordance with the physical position of the lens carriage, and this is indicated schematically by the mechanical coupling between the lens carriage mechanical input 304 and the electrical correction function 308.

As described thus far, the follow focus system of FIGURE 3 controls the position of the camera carriage with respect to the lens carriage in the same manner as the follow focus system of FIGURE 2. However, a double pole-double throw switch 334, corresponding to the switch 34 in FIGURE 1, is adapted to automatically disable the follow focus control system upon being switched from the "automatic" position to the "manual" position indicated in FIGURE 3. In the "manual" position of the switch 334, the automatic follow focus indicating light 336, corresponding to the light 36 in FIGURE 1, will go out to indicate that the camera carriage 128 can be positioned independently of the automatic follow focus system. In this regard, placement of the switch 334 in the "manual" position disconnects the output of the amplifier 208 from the input to the servomotor 176 and substitutes the electrical potential available at the manual direction switch 338 as input to the motor.

If it is desired to move the camera carriage 128 in either direction, independently of the follow focus system, the manual direction switch 338, corresponding to the switch 38 in FIGURE 1, can be selectively positioned to connect lines 342 (positive potential) or 344 (negative potential) as input to the servomotor 176 to drive the camera carriage 128 in the desired direction.

It will be apparent from the foregoing that, while particular forms of our invention have been illustrated and described, various modifications can be made without departing from the spirit and scope of our invention. Accordingly, we do not intend that our invention be limited, except as by the appended claims.

We claim:
1. An automatic follow focus system, comprising:
a lens;
a camera;
first positioning means for said lens;
second positioning means for said camera;
servomechanism means responsive to operation of said first positioning means for controlling said second positioning means as a function of the position of said lens, whereby a sharply focused camera image is maintained;
calibration means coupled to said first positioning means for feeding a variable electrical input to said servomechanism means to compensate for mechanical inaccuracies in said follow focus eystem over substantially the entire range of said first positioning means and said second positioning means, said calibration means being adjustable to vary the electrical compensation provided so as to accommodate said follow focus system to lenses of different effective length;
and means for selectively operating said second positioning means independently of said first positioning means.

2. In an optical printer apparatus, a follow focus system, comprising:
means for establishing a subject plane;
a lens carriage;
a printer lens mounted upon said lens carriage for movement therewith;
a camera carriage;
a camera mounted upon said camera carriage for movement therewith;
first mechanical means for controlling the movement of said lens carriage;
second mechanical means for controlling the movement of said camera carriage;
a servomotor for driving said second mechanical means;
camming means controlled by said first mechanical means and positioned in accordance with the position of said printer lens with respect to said subject plane;
an error potentiometer having a resistance body and a slider in electrical contact with said resistance body, the relative position of said slider with respect to said resistance body being controlled by said camming means and said camera carriage;
a voltage source connected across the two ends of said resistance body, a point intermediate said two ends being at substantially zero potential, said camming means tending to displace said slider away from said point at zero potential in accordance with a follow focus function;
and feedback means for feeding the error voltage developed between said slider and said point at zero potential as input to said servomotor to cause said servomotor to drive said second mechanical means to move said camera carriage and said camera until said error voltage has been reduced to zero, whereby the camera image produced by said printer lens is in sharp focus.

3. In an optical printer apparatus, a follow focus system, comprising:
means for establishing a subject plane;
a lens carriage;
a printer lens mounted upon said lens carriage for movement therewith;
a camera carriage;
a camera mounted upon said camera carriage for movement therewith;
first mechanical means for controlling the movement of said lens carriage;
second mechanical means for controlling the movement of said camera carriage;
a servomotor for driving said second mechanical means;
camming means controlled by said first mechanical means and positioned in accordance with the position of said printer lens with respect to said subject plane;
an error potentiometer having a resistance body and a slider in electrical contact with said resistance body, the relative position of said slider with respect to said resistance body being controlled by said camming means and said camera carriage;
a voltage source connected across the two ends of said resistance body, a point intermediate said two ends being at substantially zero potential, said camming means tending to displace said slider away from said point at zero potential in accordance with a follow focus function;
feedback means for feeding the error voltage developed between said slider and said point at zero potential as input to said servomotor to cause said servomotor to drive said second mechanical means to move said camera carriage and said camera until said error voltage has been reduced to zero, whereby the camera image produced by said printer lens is in sharp focus;

and means for operating said servomotor to drive said second mechanical means independently of said camming means and said follow focus system.

4. In an optical printer apparatus, a follow focus system, comprising:

means for establishing a subject plane;
a lens carriage;
a printer lens mounted upon said lens carriage for movement therewith;
a camera carriage;
a camera mounted upon said camera carriage for movement therewith;
first mechanical means for controlling the movement of said lens carriage;
second mechanical means for controlling the movement of said camera carriage;
a servomotor for driving said second mechnical means;
camming means controlled by said first mechanical means and positioned in accordance with the position of said printer lens with respect to said subject plane;
an error potentiometer having a resistance body and a slider in electrical contact with said resistance body, the relative position of said slider with respect to said resistance body being controlled by said camming means and said camera carriage;
a voltage source connected across the two ends of said resistance body, a point intermediate said two ends being at substantially zero potential, said camming means tending to displace said slider away from said point at zero potential in accordance with a follow focus function;
feedback means for feeding the error voltage developed between said slider and said point at zero potential as input to said servomotor to cause said servomotor to drive said second mechanical means to move said camera carriage and said camera until said error voltage has been reduced to zero, whereby the camera image produced by said printer lens is in sharp focus;
and adjustable calibration means for feeding an additional calibration voltage as input to said servomotor to correct for mechanical inaccuracies in said camming means.

5. In an optical printer apparatus, a follow focus system, comprising:

means for establishing a subject plane;
a lens carriage;
a printer lens mounted upon said lens carriage for movement therewith;
a camera carriage;
a camera mounted upon said camera carriage for movement therewith;
first mechanical means for controlling the movement of said lens carriage;
second mechanical means for controlling the movement of said camera carriage;
a servomotor for driving said second mechanical means;
camming means controlled by said first mechanical means and positioned in accordance with the position of said printer lens with respect to said subject plane;
an error potentiometer having a resistance body and a slider in electrical contact with said resistance body, the relative position of said slider with respect to said resistance body being controlled by said camming means and said camera carriage;
a voltage source connected across the two ends of said resistance body, a point intermediate said two ends being at substanially zero potential, said camming means tending to displace said slider away from said point at zero potential in accordance with a follow focus function;
feedback means for feeding the error voltage developed between said slider and said point at zero potential as input to said servomotor to cause said servomotor to drive said second mechanical means to move said camera carriage and said camera until said error voltage has been reduced to zero, whereby the camera image produced by said printer lens is in sharp focus;
adjustable calibration means for feeding an additional follow focus correction voltage as input to said servomotor to compensate for mechanical inaccuracies in said camming means, said calibration means including a calibration potentiometer wherein the electrical potentials at a plurality of points along said calibration potentiometer are selectively established at proper levels for providing the necessary input correction function to said servomotor;
and means for positioning the slider of said calibration potentiometer in accordance with the position of said lens carriage established by said first mechanical means.

6. In an optical printer apparatus, a follow focus system, comprising:

means for establishing a subject plane;
a lens carriage;
a printer lens mounted upon said lens carriage for movement therewith;
a camera carriage;
a camera mounted upon said camera carriage for movement therewith;
first mechanical means for controlling the movement of said lens carriage;
second mechanical means for controlling the movement of said camera carriage;
a servomotor for driving said second mechanical means;
camming means controlled by said first mechanical means and positioned in accordance with the position of said printer lens with respect to said subject plane;
an error potentiometer having a resistance body and a slider in electrical contact with said resistance body, the relative position of said slider with respect to said resistance body being controlled by said camming means and said camera carriage;
a voltage source connected across the two ends of said resistance body, a point intermediate said two ends being at substantially zero potential, said camming means tending to displace said slider away from said point at zero potential in accordance with a follow focus function;
feedback means for feeding the error voltage developed between said slider and said point at zero potential as input to said servomotor to cause said servomotor to drive said second mechanical means to move said camera carriage and said camera until said error voltage has been reduced to zero, whereby the camera image produced by said printer lens is in sharp focus;
variable calibration means for feeding an additional calibration voltage as input to said servomotor to compensate for mechanical inaccuracies in said camming means and to thereby increase the accuracy of follow focus of the camera image at a plurality of points throughout the travel range of said lens carriage and said camera carriage;
and means for selectively energizing said servomotor to drive said second mechanical means independently of said camming means and said follow focus system.

7. An automatic follow focus system for an optical printer, comprising:

means for establishing a subject plane;
a lens carriage;
a printer lens mounted upon said lens carriage for movement therewith;

a camera carriage;
a camera mounted upon said camera carriage for movement therewith;
first mechanical means for controlling the movement of said lens carriage;
second mechanical means for controlling the movement of said camera carriage;
linear cam means mounted upon said camera carriage;
rotary cam means actuated by said first mechanical means, the radial distance of each point along the periphery of said rotary cam means from the axis of rotation of said rotary cam means being proportional to the distance of said camera from said printer lens required for a sharply focused camera image, said rotary cam means being positioned in accordance with the position of said printer lens with respect to said subject plane;
a first cam follower for said linear cam means;
a second cam follower for said rotary cam means;
an error potentiometer having a resistance body and a slider in electrical contact with said body, said resistance body being mounted upon one of said cam followers, said slider being mounted upon the other of said cam followers, the position of said slider along said resistance body being a function of the positions of said first and said second cam followers in accordance with the positions of said linear cam means and said rotary cam means positioned by said camera carriage and said lens carriage, respectively;
a voltage source connected across the two ends of said resistance body, a point intermediate said two ends being at substantially zero potential;
a servomotor for driving said second mechanical means;
and feedback means for feeding the error voltage developed between said slider and said point at zero potential as input to said servomotor to cause said servomotor to drive said second mechanical means to move said camera carriage and said camera until said cam followers have been repositioned relative to each other to reduce said error voltage to zero, whereby the image produced by said printer lens is in sharp focus at the film plane in said camera.

8. An automatic follow focus system for an optical printer, comprising:
means for establishing a subject plane;
a lens carriage;
a printer lens mounted upon said lens carriage for movement therewith;
a camera carriage;
a camera mounted upon said camera carriage for movement therewith;
first mechanical means for controlling the movement of said lens carriage;
second mechanical means for controlling the movement of said camera carriage;
linear cam means mounted upon said camera carriage;
rotary cam means actuated by said first mechanical means, the radial distance of each point along the periphery of said rotary cam means from the axis of rotation of said rotary cam means being proportional to the distance of said camera from said printer lens required for a sharply focused camera image, said rotary cam means being positioned in accordance with the position of said printer lens with respect to said subject plane;
a first cam follower for said linear cam means;
a second cam follower for said rotary cam means;
an error potentiometer having a resistance body and a slider in electrical contact with said body, said resistance body being mounted upon one of said cam followers, said slider being mounted upon the other of said cam followers, the position of said slider along said resistance body being a function of the positions of said first and said second cam followers in accordance with the positions of said linear cam means and said rotary cam means positioned by said camera carriage and said lens carriage, respectively;
a voltage source connected across the two ends of said resistance body, a point intermediate said two ends being at substantially zero potential;
a servomotor for driving said second mechanical means;
feedback means for feeding the error voltage developed between said slider and said point at zero potential as input to said servomotor to cause said servomotor to drive said second mechanical means to move said camera carriage and said camera until said cam followers have been repositioned relative to each other to reduce said error voltage to zero, whereby the image produced by said printer lens is in sharp focus at the film plane in said camera;
and adjustable calibration means for feeding a continuously variable correction voltage as input to said servomotor to compensate for mechanical inaccuracies in said linear cam means and said rotary cam means and to thereby increase the accuracy of follow focus of the camera image throughout the travel range of said lens carriage and said camera carriage.

9. An automatic follow focus system for an optical printer, comprising:
means for establishing a subject plane;
a lens carriage;
a printer lens mounted upon said lens carriage for movement therewith;
a camera carriage;
a camera mounted upon said camera carriage for movement therewith;
first mechanical means for controlling the movement of said lens carriage;
second mechanical means for controlling the movement of said camera carriage;
linear cam means mounted upon said camera carriage;
rotary cam means actuated by said first mechanical means, the radial distance of each point along the periphery of said rotary cam means from the axis of rotation of said rotary cam means being proportional to the distance of said camera from said printer lens required for a sharply focused camera image, said rotary cam means being positioned in accordance with the position of said printer lens with respect to said subject plane;
a first cam follower for said linear cam means;
a second cam follower for said rotary cam means;
an error potentiometer having a resistance body and a slider in electrical contact with said body, said resistance body being mounted upon one of said cam followers, said slider being mounted upon the other of said cam followers, the position of said slider along said resistance body begin a function of the positions of said first and said second cam followers in accordance with the positions of said linear cam means and said rotary cam means positioned by said camera carriage and said lens carriage, respectively;
a voltage source connected across the two ends of said resistance body, a point intermediate said two ends being at substantially zero potential;
a servomotor for driving said second mechanical means;
feedback means for feeding the error voltage developed between said slider and said point at zero potential as input to said servomotor to cause said servomotor to drive said second mechanical means to move said camera carriage and said camera until said cam followers have been repositioned relative to each other to reduce said error voltage to zero, whereby the image produced by said printer lens is in sharp focus at the film plane in said camera;
and means for selectively energizing said servomotor to drive said second mechanical means in either of two directions independently of the follow focus functions of said linear and said rotary cam means.

10. An automatic follow focus system for an optical printer, comprising:
   means for establishing a subject plane;
   a lens carriage;
   a printer lens mounted upon said lens carriage for movement therewith;
   a camera carriage;
   a camera mounted upon said camera carriage for movement therewith;
   first mechanical means for controlling the movement of said lens carriage;
   second mechanical means for controlling the movement of said camera carriage;
   linear cam means mounted upon said camera carriage;
   rotary cam means actuated by said first mechanical means, the radial distance of each point along the periphery of said rotary cam means from the axis of rotation of said rotary cam means being proportional to the distance of said camera from said printer lens required for a sharply focused camera image, said rotary cam means being positioned in accordance with the position of said printer lens with respect to said subject plane;
   a first cam follower for said linear cam means;
   a second cam follower for said rotary cam means;
   an error potentiometer having a resistance body and a slider in electrical contact with said body, said resistance body being mounted upon one of said cam followers, said slider being mounted upon the other of said cam followers, the position of said slider along said resistance body being a function of the positions of said first and said second cam followers in accordance with the positions of said linear cam means and said rotary cam means positioned by said camera carriage and said lens carriage, respectively;
   a voltage source connected across the two ends of said resistance body, a point intermediate said two ends being at substantially zero potential;
   a servomotor for driving said second mechanical means;
   feedback means for feeding the error voltage developed between said slider and said point at zero potential as input to said servomotor to cause said servomotor to drive said second mechanical means to move said camera carriage and said camera until said cam followers have been repositioned relative to each other to reduce said error voltage to zero, whereby the image produced by said printer lens is in sharp focus at the film plane in said camera;
   adjustable calibration means for feeding an additional follow focus correction voltage as input to said servomotor to compensate for mechanical inaccuracies in said linear cam means and said rotary cam means, said calibration means including a calibration potentiometer wherein the electrical potentials at a plurality of points along said calibration potentiometer are selectively established at proper levels for providing the necessary input correction function to said servomotor;
   and means for positioning the slider of said calibration potentiometer in accordance with the position of said lens carriage established by said first mechanical means.

11. An automatic follow focus system for an optical printer, comprising:
   means for establishing a subject plane;
   a lens carriage;
   a printer lens mounted upon said lens carriage for movement therewith;
   a camera carriage;
   a camera mounted upon said camera carriage for movement therewith;
   first mechanical means for controlling the movement of said lens carriage;
   second mechanical means for controlling the movement of said camera carriage;
   linear cam means mounted upon said camera carriage;
   rotary cam means actuated by said first mechanical means, the radial distance of each point along the periphery of said rotary cam means from the axis of rotation of said rotary cam means being proportional to the distance of said camera from said printer lens required for a sharply focused camera image, said rotary cam means being positioned in accordance with the position of said printer lens with respect to said subject plane;
   a first cam follower for said linear cam means;
   a second cam follower for said rotary cam means;
   an error potentiometer having a resistance body and a slider in electrical contact with said body, said resistance body being mounted upon one of said cam followers, said slider being mounted upon the other of said cam followers, the position of said slider along said resistance body being a function of the positions of said first and said second cam followers in accordance with the positions of said linear cam means and said rotary cam means positioned by said camera carriage and said lens carriage, respectively;
   a voltage source connected across the two ends of said resistance body, a point intermediate said two ends being at substantially zero potential;
   a servomotor for driving said second mechanical means;
   feedback means for feeding the error voltage developed between said slider and said point at zero potential as input to said servomotor to cause said servomotor to drive said second mechanical means to move said camera carriage and said camera until said cam followers have been repositioned relative to each other to reduce said error voltage to zero, whereby the image produced by said printer lens is in sharp focus at the film plane in said camera;
   adjustable calibration means for feeding an additional correction voltage as input to said servomotor to compensate for mechanical inaccuracies in said linear cam means and said rotary cam means, said calibration means including a calibration potentiometer wherein the electrical potentials at a plurality of points along said calibration potentiometer are selectively established at proper levels for providing the necessary input correction function to said servomotor;
   means for positioning the slider of said calibration potentiometer in accordance with the position of said lens carriage established by said first mechanical means;
   and means for selectively operating said servomotor to drive said second mechanical means in either of two directions independently of said linear cam means, said rotary cam means and the position of said lens carriage.

12. Apparatus as set forth in claim 11, wherein said first mechanical means includes a lead screw in driving engagement with a ball nut affixed to said lens carriage, and said second mechanical means include a lead screw in driving engagement with a ball nut affixed to said camera carriage.

References Cited

UNITED STATES PATENTS

| | | | |
|---|---|---|---|
| 2,618,209 | 11/1952 | Silent | 95—45 |
| 2,968,994 | 1/1961 | Shurcliff | 88—24 X |

NORTON ANSHER, *Primary Examiner.*

RICHARD A. WINTERCORN, *Assistant Examiner.*